July 27, 1965 N. C. SCHUTT ETAL 3,197,170
VACUUM FILM SUPPORT
Filed April 10, 1963 2 Sheets-Sheet 1
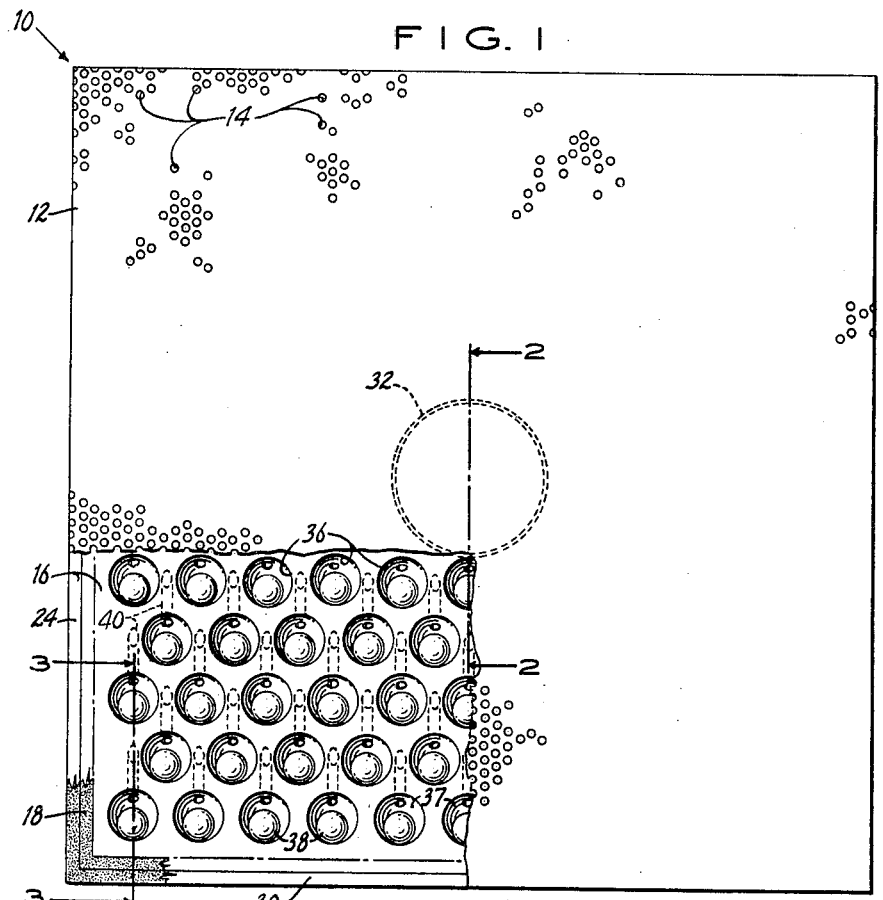
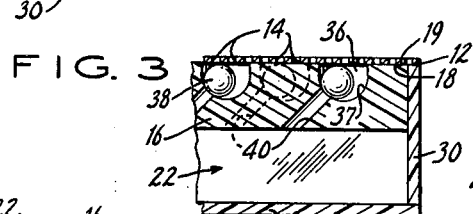
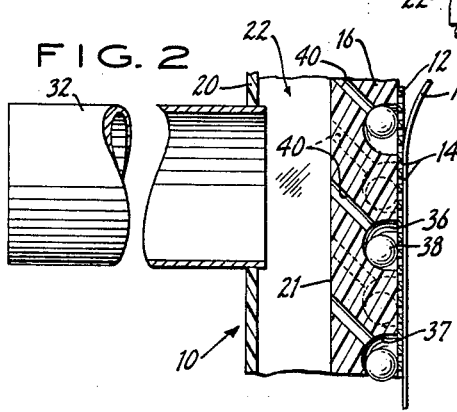
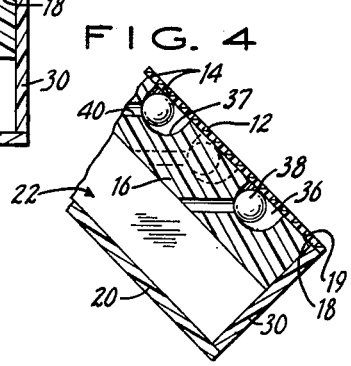
INVENTOR.
NORMAN C. SCHUTT
FLOYD W. FLYNN
BY
Morgan, Finnegan, Durham & Pine
ATTORNEYS July 27, 1965  N. C. SCHUTT ETAL  3,197,170
VACUUM FILM SUPPORT Filed April 10, 1963  2 Sheets-Sheet 2

INVENTOR.
NORMAN C. SCHUTT
FLOYD W. FLYNN
BY
Morgan, Finnegan, Durham & Pine
ATTORNEYS United States Patent Office 3,197,170
Patented July 27, 1965

3,197,170
VACUUM FILM SUPPORT
Norman C. Schutt and Floyd W. Flynn, Glen Cove, N.Y., assignors to Powers Chemco, Inc., Glen Cove, N.Y., a corporation of New York
Filed Apr. 10, 1963, Ser. No. 272,148
5 Claims. (Cl. 248—363)

The present invention relates to a support for a sheet of film in a photomechanical camera and, more particularly, to an improved vacuum board for holding a sheet of film in exposure position.

In large photomechanical cameras, the photosensitive material is retained in exposure position by means of a support to which a suction force is applied. The support generally has a foraminous face plate against which the sheet is placed with the openings in the face plate communicating with a source of suction through a plurality of individual passages leading from a common suction manifold chamber. Heretofore, these passages from the manifold have been transverse to the plane of the face plate. It has already been proposed to control the suction flow from each of these transverse passages to its associate openings by means of a gravity-biased ball valve member as disclosed in Anander Patent 2,910,265, issued October 27, 1959.

The structure disclosed in said patent operated satisfactorily in a camera wherein the film was placed against the support while the support was vertically disposed. However, in some cameras, the film sheet is placed on the support while it is in horizontal disposition. In these cameras, the support with the film placed thereon is then rotated into vertical exposure position as shown and described in Schutt et al. Patent 2,939,371 of June 7, 1960. In such a film loading arrangement, the transverse passage and gravity-biased ball valve of the Anander arrangement could not be used since no suction would be applied to the film-bearing face plate with the support in horizontal disposition.

The present invention is therefore characterized by a novel passage and ball valve structure for a film vacuum support which can be incorporated into a photomechanical camera having any desired film loading arrangement. In accordance with the present invention, the openings in the face plate of the vacuum support communicate with a plurality of spaced recesses or valve seats preferably formed in an intermediate plate contiguous to the face plate. In turn, each recess is provided with a passage disposed angularly to the plane of the face plate and leads to a common manifold chamber connected to the suction source. The passages are preferably located adjacent the top of their related recesses when the board is in vertical position. In each recess there is provided a suction flow control valve comprising a ball valve member freely movable within its associated recess. By providing angular suction passages for the recesses, in any position of the film support from horizontal to vertical planar disposition, the ball valve member is normally gravity-biased to an open position so that a film sheet can be retained against the face plate of the support by vacuum. Thus, the present invention permits the utility of a freely movable ball valve member in photomechanical cameras in which the film support is rotated to horizontal disposition for placement of film thereon.

OBJECTS

The object of the present invention, therefore, is to provide a new and improved vacuum film support for photomechanical cameras.

Another object of the invention is to provide an improved vacuum film support capable of supporting film thereon in any planar disposition of said support.

A further object of the invention is to provide an improved vacuum film support including a freely-movable ball valve member for controlling the flow of suction to the film and a suction passage controlled by the ball valve and disposed at an angle to the plane of the film supporting face, whereby suction can be supplied to the face whether the support is horizontally or vertically disposed.

Objects and advantages of the invention will be obvious herefrom, or may be learned by practice with the invention, the same being realized and attained by means of the instrumentalities and combinations pointed out in the appended claims.

The accompanying drawings, referred to herein and constituting a part hereof, illustrate one embodiment of the invention and together with the description, serve to explain the principles of the invention.

FIG. 1 is a plan view of the preferred embodiment of improved support of the present invention with a portion of the face plate broken away to show details of the valve construction.

FIG. 2 is a detailed sectional view of a portion of the support adjacent the connection of the board to the suction conduit, illustrating the details of the valve arrangement with the support in normal, vertical exposure disposition.

FIG. 3 is a detailed sectional view of a portion of the support illustrating details of the valve arrangement with the support shown in horizontal disposition.

FIG. 4 is a detailed sectional view of a portion of the support illustrating details of the valve arrangement with the support shown disposed in a position intermediate the position illustrated in FIGS. 2 and 3.

Figure 5:
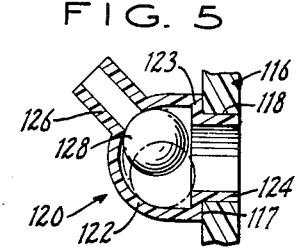
FIG. 5 is a detailed view of a modified form of valve for use in the present invention.

Referring to the drawings and specifically to FIGS. 1 and 2, the support of the present invention is designated generally 10. Support 10 comprises a smooth, flat face plate 12 having a plurality of regularly-spaced openings 14. Plate 12 is adapted to have the sheet of photosensitive material such as film F placed thereagainst and held in firm contact therewith by application of suction through openings 14. Overlying the back of plate 12 and in intimate contact therewith is an intermediate plate 16 cemented to plate 12 along the outer matching margins 18 and 19 of plates 12 and 16 respectively. The support 10 includes a back plate 20 spaced from the rear face 21 of plate 16 to form a suction manifold 22 in support 10. Manifold 22 is enclosed by a pair of side plates, one of which, side plate 24 is shown, and top and bottom plates, bottom plate 30 is shown cemented to intermediate plate 16 and back plate 20 to complete support 10.

To furnish suction to support 10, a connector 32 is provided which communicates at one end thereof with manifold chamber 22 through back plate 20 and at its other end with a suction conduit 34 leading to a source of suction (not shown).

To control the flow of suction from manifold chamber 22 to opening 14 in face plate 12, intermediate plate 16 is provided with a plurality of spaced recesses or valve seats 36 which communicate directly with openings 14. Recesses 36 are generally arcuately-shaped and extend only partially through plate 16. In the preferred form, recesses 36 are semi-spherical with the arcuate surface 37 of recess 36 extending away from face plate 12. Located in each recess 36 is a ball valve member 38 freely contained in recess 36 between the arcuate surface 37 thereof and the rear face of face plate 12, as shown best in FIGS. 2–4.

To provide communication between recess 36 and manifold chamber 22, there is provided for each recess 36 a bore or passage 40 extending from surface 37 to chamber 22. Passage 40 is angularly disposed relative to the plane of face plate 12. As shown best in FIG. 2, when support 10 is in vertical disposition, each passage 40 communicates with the upper portion of surface 37 of its related recess 36 and extends upwardly away therefrom.

Ball valve member 38 is always in contact with surface 37, resting on the lower portion thereof as shown in FIG. 2 when support 10 is vertical. When support 10 is horizontal, ball valve 38 generally rests on the portion of surface 37 most remote from face plate 12.

In operation the support 10 is mounted in its associated camera in any desired manner. Preferably the support is mounted on a support frame pivotally secured to portions of the camera frame. A suitable mounting frame and associated mechanism is disclosed in the aforesaid Schutt et al. Patent 2,939,371. Further description is therefore omitted in the interests of brevity.

In exposure position, support 10 is disposed vertically as shown in FIG. 2 with the flexible sheet of photosensitive material F held against face plate 12 for exposure. With suction applied to the support 10 through conduit 34 and connector 32, in each recess 36 over which the sheet F lies, ball valve member 38 remains in its open or non-valving position resting on the lowermost position of surface 37 as shown in FIGS. 2–4. Thus the suction is applied through manifold chamber 22, and its related passage 40 into said recess 36 and hence to its associated openings 14 and is effective to draw the sheet into firm, intimate contact with face plate 10.

In the case of those recesses 36 whose associated openings 14 are not covered by the sheet of film F, when suction is applied to support 10, the flow of air through these uncovered openings 14 causes the ball valves 38s in their associated recesses 36 to roll up the arcuate surface 37 thereof into its closed or valving position at passage 40, as shown in FIGS. 2–4. This interrupts the further flow of air through that particular recess 36. Thus, the suction is only applied to those openings 14 against which the sheet of film F is positioned.

As described hereinabove, in some cameras such as in the aforementioned Schutt et al. patent, support 10 is rotated to a generally horizontal position so that cut film may be readily positioned on the face plate 12. In this film loading position, the cut film is placed on face plate 12 by the operator and suction applied. In those recesses 36 over which the film is disposed, the ball valve member 38 remains in open or non-valving position and according suction is applied through their associated openings 14. In those recesses 36 having no film disposed thereover, the ball valve member is rolled along surface 37 to its closed position.

In like manner, during any intermediate position of support 10 between horizontal loading position and vertical exposure position with passages 40 located as shown in FIG. 4, ball valves 38, though freely mounted in their associated recesses 36, cannot inadvertently move to a closed position against their related passage 40. Thus, in any disposition of support 10, ball valves 38 are operative to properly control the flow of suction to face plate 12.

When the sheet of film material is ready to be removed, the suction is relieved and the film sheet removed with the support in either vertical or horizontal position as desired, after which the support is ready to receive the next sheet of film.

In a typical arrangement of a support embodying the preferred form of the present invention, the support 10 may have overall dimensions of 26" in height and 23" wide. The hole in the face plate which may be a phenolic sheet may be .86" in diameter positioned in 9/64" centers.

The intermediate plate 16 which may be of any suitable thermoplastic or metal ½" thick while side and bottom plates 24, 26 and 28 and 30 and back plate 20 may also be of any suitably thermoplastic or metal ⅛" thick. Recesses 36 may be 9/32" deep and generally dome-shaped with a semi-spherical section of a radius of 3/16". Recesses 36 may be in staggered rows ½" on centers in each direction while ball valve 38 may also be of plastic and shaped as a sphere ¼" in diameter and passages 40 are cylindrical of a diameter of 3/32".

In a modified form of the invention shown in FIG. 5, the intermediate plate 116 is provided with a plurality of circular openings 118 completely therethrough. To control the flow of suction through openings 118, each opening 118 is provided with a valve member 120 comprising a semi-spherical section 122 of a diameter slightly larger than opening 118 and cylindrical section 124 adapted to fit snugly in opening 118 with the flange 123 connecting sections 122 and 124 positioned against the back surface 117 of plate 116. Valve 120 also includes a second cylindrical section 126 communicating at one end thereof with the interior of section 122 and adapted at its other end to communicate with manifold chamber 22. Section 126 is angularly disposed to the plane of face plate 12 as shown in FIG. 5 in the same manner as passage 40 of the preferred embodiment.

Valve 120 also includes a ball valve member 128 freely mounted therein and constructed and arranged to operate as ball valve 38 of the preferred embodiment to suitably control the application of suction to face plate 12 in any position of support 10.

The arrangement of this embodiment permits pre-forming of valves 120 which may be of moldable plastic and capable of ready insertion into their associated openings 118, thus decreasing fabricating time and costs in the construction of support 10.

Figure 6:
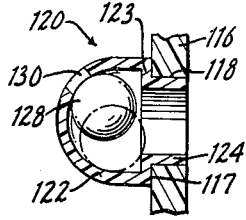
FIG. 6 is a detailed view of another modified form of valve for use in the present invention.
Figure 7:
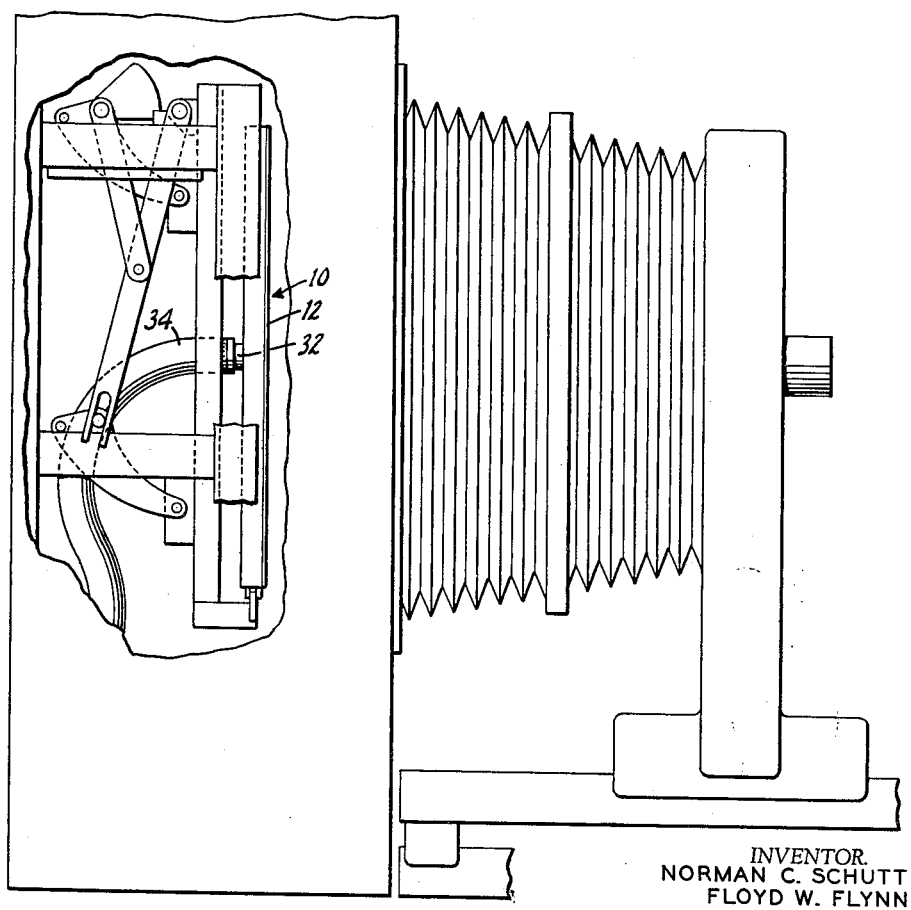
FIG. 7 is a side elevation, partly broken away, of a photomechanical camera embodying the present invention.

Turning to FIG. 6, it will be understood that valve 120 can be constructed without section 126. In this arrangement, section 126 is replaced by an opening 130 in valve 120 located, as was section 126, in the upper portion of section 122. Opening 130 communicates with the interior of valve 120 and with manifold chamber 22 to form a restricted communication therebetween controlled by its associated ball valve 128 in like manner to the ball valve 38 of the preferred embodiment.

Thus there is disclosed a single, efficient and relatively inexpensive vacuum support structure for suitably holding a sheet of film by means of suction or any desired planar disposition of the support.

What is claimed is:

1. In a photomechanical camera, the combination of a support for a sheet of photosensitive material, means mounting said support for movement to and from a generally horizontal sheet-loading position to a generally vertical sheet-exposure position, said support including a foraminous flat face plate against which a sheet to be exposed is positioned, a plurality of valve seats, each individually communicating with a group of openings in said face plate, a suction manifold chamber, means selectively connecting said chamber to a source of suction, an individual passageway for each valve seat forming a restricted communication between said chamber and valve seat, and its associated opening to retain said sheet in contact with said face plate by suction applied to said openings, each of said passageways being constructed and arranged at an acute angle to the plane of said face plate, a ball valve member freely disposed in each of said seats for controlling the flow of suction through its associated passageway, said ball valve member being of a diameter and said acute angle being of such size that the ball valve member in its equilibrium position, in the absence of applied suction, will not block its associated passageway when the support is disposed in any disposition from said horizontal loading position to said vertical exposure position, said ball valve member being adapted to move into closed valving engagement with its related passageway when, upon application of suction to said chamber, its related openings are unrestricted by a sheet of material thereagainst.

2. In a photomechanical camera, the combination of a support for a sheet of photosensitive material, means mounting said support for movement to and from a generally horizontal sheet-loading position to a generally vertical sheet-exposure position, said support including a foraminous flat face plate against which a sheet to be exposed is positioned, a parallel back plate secured in fluid-tight spaced relationship with said face plate, a plurality of arcuate valve seats, each individually communicating with a group of openings in said face plate, a suction manifold chamber defined by said opposed face and back plates, means selectively connecting said chamber to a source of suction, an individual passageway for each valve seat forming a restricted communication between said chamber and valve seat, and its associated opening to retain said sheet in contact with face plate by suction applied to said openings, each of said passageways being constructed and arranged at an acuate angle to the plane of said face plate, a ball valve member freely disposed in each of said seats for controlling the flow of suction through its associated passageway, said ball valve member being of a diameter and said acute angle being of such size that the ball valve member in its equilibrium position, in the absence of applied suction, will not block its associated passageway when the support is disposed in any disposition from said horizontal loading position to said vertical exposure position, said ball valve member being adapted to roll along the arcuate surface of its valve seat into closed valving engagement with its related passageway when, upon application of suction to said chamber, its related openings are unrestricted by a sheet of material thereagainst.

3. In a photomechanical camera, the combination of a support for a sheet of photosensitive material, means mounting said support for movement to and from a generally horizontal sheet-loading position to a generally vertical sheet-exposure position, said support including a formaminous flat face plate against which a sheet to be exposed is positioned, an intermediate plate secured contiguously to said face plate and having a plurality of indentations partially therethrough and each indentation communicating with a group of openings in said face plate when said face plate and intermediate plate are in assembled relationship, a suction manifold chamber, means selectively connecting said chamber to a source of suction, an individual passageway for each indentation forming a restricted communication between said chamber and indentation, and its associated opening to retain said sheet in contact with said face plate by suction applied to said openings, each of said passageways being constructed and arranged at an acute angle to the plane of said face plate, a ball valve member freely disposed in each of said indentations for controlling the flow of suction through its associated passageway, said ball valve member being of a diameter and said acute angle being of such size that the ball valve member in its equilibrium position, in the absence of applied suction, will not block its associated passageway when the support is disposed in any disposition from said horizontal loading position to said vertical exposure position, said ball valve member being adapted to move into closed valving engagement with its related passageway when, upon application of suction to said chamber, its related openings are unrestricted by a sheet of material thereagainst.

4. The invention as defined in claim 1, including an intermediate plate secured contiguously to said face plate and spaced from said back plate, said intermediate plate having a plurality of openings therethrough and wherein said valve seats comprise individual valving units associated with said openings and having an arcuate body portion enclosing said ball valve member, a tubular locating section extending from said body portion and adapted to be inserted into one of said openings for communicating said face plate openings with said valving unit and means communicating said body portion of said units with said suction manifold.

5. The invention as defined in claim 4, wherein said last-named valving unit suction communicating means is disposed in the upper section of said body portion when said support is in vertical exposure position.

References Cited by the Examiner

UNITED STATES PATENTS

| | | | |
|---|---|---|---|
| 2,638,308 | 5/53 | Kell | 137—519.5 |
| 2,910,265 | 10/59 | Anander | 248—363 |
| 2,916,042 | 12/59 | Brady | 137—519.5 |

FRANK L. ABBOTT, *Primary Examiner.*

CLAUDE A. LE ROY, *Examiner.*